Oct. 13, 1942.  T. I. DUFFY  2,298,283
PEDAL FOR FOOT PROPELLED VEHICLES
Filed Jan. 2, 1941   2 Sheets—Sheet 1

Inventor
Thomas I. Duffy
By J. S. Murray
Attorney

Oct. 13, 1942.    T. I. DUFFY    2,298,283
PEDAL FOR FOOT PROPELLED VEHICLES
Filed Jan. 2, 1941    2 Sheets-Sheet 2

Inventor
Thomas I. Duffy
By
J. S. Murray
Attorney

Patented Oct. 13, 1942

2,298,283

UNITED STATES PATENT OFFICE 2,298,283

PEDAL FOR FOOT PROPELLED VEHICLES

Thomas I. Duffy, Detroit, Mich., assignor to Delray Manufacturing Company, Detroit, Mich., a corporation of Michigan Application January 2, 1941, Serial No. 372,731

8 Claims. (Cl. 74—594.4)

This invention relates to pedals for foot propelled vehicles and particularly bicycles.

An object of the invention is to equip a pedal with a U-shape tread so as to provide tread faces across the outer end of a pedal as well as at each side of its axis, such tread furthermore affording protection against impact to the free end of the pedal pin.

Another object is to form a pedal tread by an elongated strip of rubber or like resilient material produced by extrusion or in other suitable manner and bent to a substantial U-shape and to reenforce such strip by a metal strip of corresponding shape conforming to one of the inner and outer faces of the resilient strip.

A further object is to provide a pedal tread employing a U-shaped resilient strip as above described, such strip being reenforced by similarly shaped metal strips engaging both the inner and outer faces of the resilient strip and to provide fasteners securely clamping the resilient strip between the metal strips.

A further object is to form the inner and outer faces of said resilient strip with channels receiving said metal strips, the resilient material projecting sufficiently beyond the metal strips toward the tread faces and parallel to said faces to largely safeguard the metal strips from impact.

A further object is to form the hub of a pedal by complementary semi-cylindrical central portions of two metal plates, and to extend such plates contiguously from the hub into supporting engagement with opposed portions of a tread.

These and various other objects the invention attains by the construction hereinafter described and illustrated in the accompanying drawings, wherein.

Figure 1:
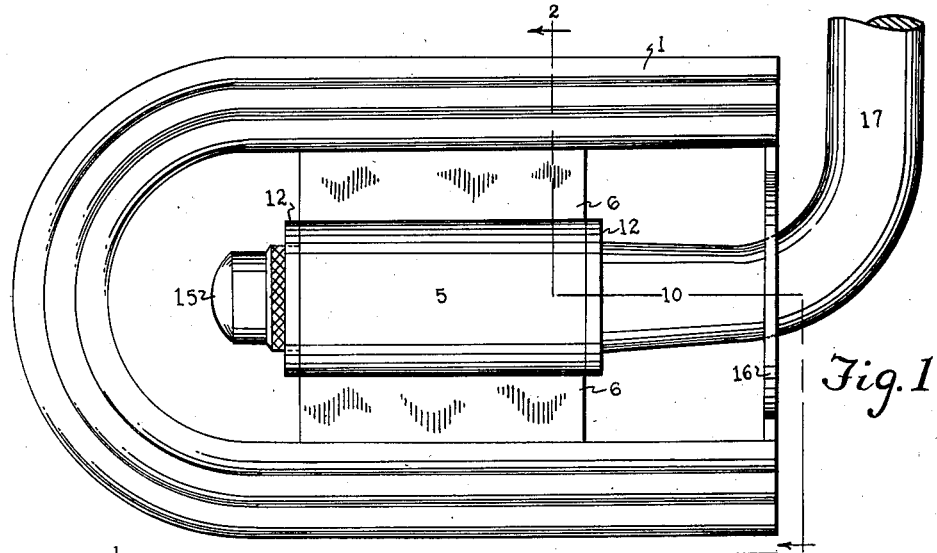
Fig. 1 is a plan view of the improved pedal operatively mounted on a pedal pin.
Figure 3:
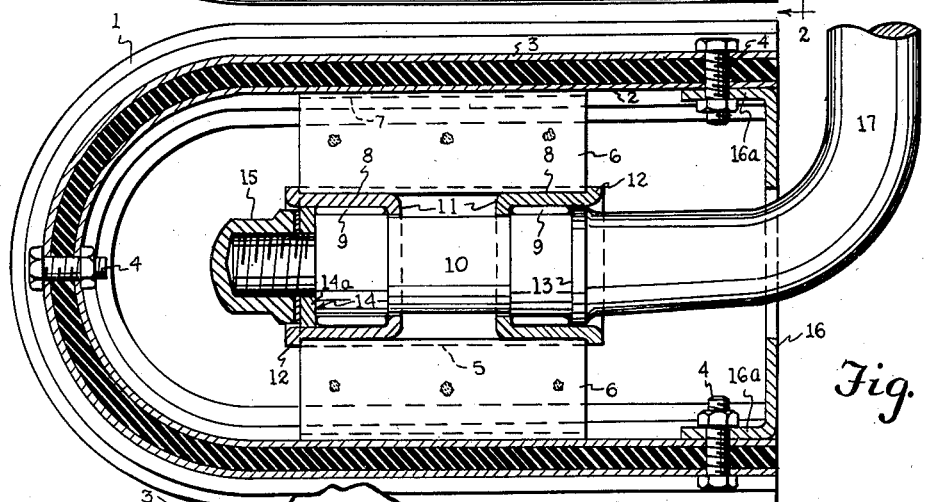
Fig. 3 is an axial sectional view of the pedal, taken upon the line 3—3 of Fig. 2.
Figure 2:
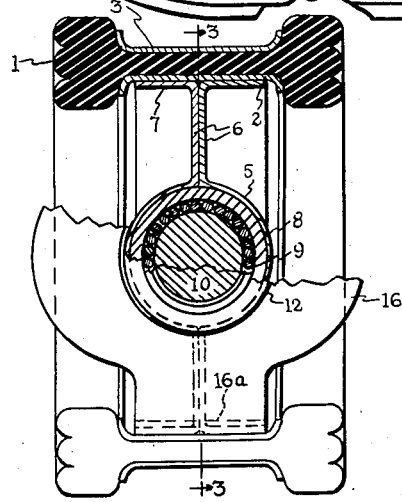
Fig. 2 is a cross-sectional view of the same, taken upon the line 2—2 of Fig. 1.

In these views the reference character 1 designates an elongated strip of rubber or other suitable resilient material formed preferably by extrusion and bent to a substantial U-shape. The inner and outer faces of said strip are grooved from end to end in their mid portions to form relatively thick heads on the opposed portions of the strip forming tread faces. Recessed within the grooves of the strip 1 are inner and outer sheet metal strips 2 and 3, coextensive in length with the strip 1 and conforming to the U-shape thereof. Said strips are preferably of a shallow channel form so as to conform to some extent to the walls of the grooves of the resilient strip as well as to the bottoms of such grooves. The metal strips 2 and 3 are clamped firmly against the inner and outer faces of the strip 1 by extending nut and bolt connections 4 or other suitable fastenings between the metal strips, through the resilient strip.

Centrally disposed within the opening formed by the described tread member and coaxial with the latter is a hub 5 formed by complementary semi-cylindrical mid portions of two sheet metal plates 6, such plates contiguously extending from the hub to the opposed parallel portions of the metal strip 2 and having marginal securing portions 7 oppositely bent within the channel formed by each of said opposed portions. The contiguous portions of the plates 6 are rigidly interconnected as by spot welding and similar rigid connections are established between the margins 7 of said plates and the strip 2. Said margins fit snugly within the channel formed by the strip 2 so as to derive a reenforcing effect from the channel-forming edges of said strip. Press-fitted in the ends of the hub is a pair of cups 8 retaining anti-friction rollers 9 preferably of a needle type, whereby the pedal is journaled upon a suitable pin 10. The inner or adjacent ends of the cups 8 are inwardly flanged as indicated at 11 to receive end thrust of said rollers and the outer ends of the cups are formed with outward annular flanges 12 to abut the ends of the hub. An annular rib 13 integrally formed upon the pin 10 provides a retainer at the other ends of one set of said rollers and fits freely within the outwardly flanged end of the corresponding cup 8. The washer 14a forms a retainer for the other ends of the other pair of rollers and fits freely within the outwardly flanged end of the corresponding cup, said washer being clamped against a shoulder 14 of the pin 10 by a cap nut 15 engaging the free end of said pin.

A reenforcing plate 16 disposed transversely to the pin 10 and centrally apertured to accommodate said pin, rigidly interconnects the free ends of the metal strip 2 and is formed with bent end portions 16a inserted in the channel of the strip 2 and engaged by two of the fastenings 4. Such reenforcing plate 16 preferably projects marginally slightly beyond the planes established by the tread faces of the strip 1 and thus assists in preventing a foot engaging the pedal form slipping inwardly toward a corresponding crank arm 17.

The described pedal is adapted for inexpensive production in that the strips 1, 2, and 3 may be readily cut from lengths of material preformed to the desired cross section. The grooved form of the strip 1 provides relatively thick head portions upon said strip adjacent the two tread faces capable of absorbing wear over a long period of time. The closed outer end of the tread affords thorough protection to the hub and to the cap nut retaining the pedal on the pin, particularly protecting such parts when the pedals encounter a street curbing or when a bicycle is allowed to lie on a side thereof. Recessing of the metal strips within the grooves formed by the inner and outer faces of the strip 1 largely safeguards the outer metal strip from impact and effects a very secure mounting of the resilient member of the tread on the pedal.

Figure 4:
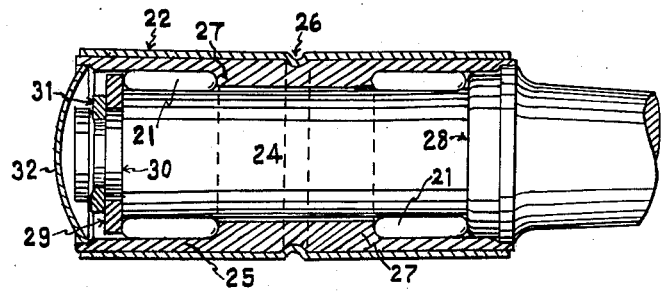
Fig. 4 is an axial sectional view of a pedal pin and pedal hub of a somewhat modified construction.
Figure 5:
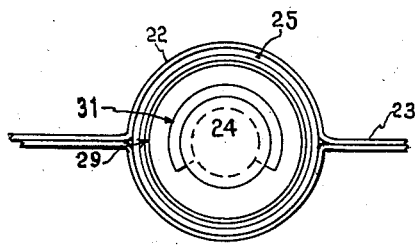
Fig. 5 is an end view of the same with the dust cap removed.

In the modification illustrated by Figs. 4 and 5, two spaced sets of rollers 21 serve to journal the hub 22 of a pedal 23 on a crank pin 24. Rigidly inserted in said hub is a sleeve 25 serving as an outer race member for both sets of rollers, and it is preferred to interconnect the hub and sleeve by press-fitting the latter within the former and annularly indenting the hub substantially midway of its length at 26 to interlock it with an annular groove or indentation in said sleeve. The sleeve has a relatively thick mid portion 27, the ends of which form abutments for the adjacent ends of the sets of rollers, and an annular rib 28 on the pin 24 forms an abutment for the other ends of the inner set of rollers. An abutment for the outer ends of the outer set of rollers is formed by a ring 29 clamped against a shoulder 30 of the pin by an approximately U-shaped spring washer 31, snapped into a groove in the outer end portion of the pin. The outer face of said groove is beveled at an angle of approximately seventy-five degrees to the pin axis so that the contractive force of the washer causes it to firmly bear against said ring to hold the latter against the shoulder 30. Dust is excluded from the hub interior by forcing a Welch plug 32 into the outer end of the sleeve 25, which is suitably annularly shouldered to provide a seat for such plug. This type of plug serves to tightly and permanently seat the outer end of the sleeve, and may be very quickly and easily applied.

Use of the single sleeve 25 in place to the two cups 8 is to be preferred, since it simplifies the operation of assembly and more positively assures a perfectly coaxial relation of the pin and pedal.

The invention is presented as including all such changes and modifications as come within the scope of the following claims.

What I claim is:

1. A pedal for a foot propelled vehicle comprising an elongated resilient strip bent to a substantial U-shape and forming a tread member, a metal strip engaging and conforming to the inner face of said tread member and having opposed portions, a plurality of spaced fastenings interconnecting the metal strip and tread member, a sheet metal reenforcing plate interconnecting the ends of the metal strip and attached to such strip by certain of said fastenings, said plate being apertured to clear a pin mounting on the pedal, a hub disposed within and substantially coaxial with the tread member, and means rigidly connecting the hub to the opposed portions of said metal strip.

2. A pedal for a foot-propelled vehicle comprising an elongated tread-forming strip of resilient material bent at its mid portion to extend across the pedal axis and having similar elongated end portions spaced from and at opposite sides of said axis, said strip being thus substantially U-shaped and having an inner and an outer face, a U-shaped metal strip conforming to and engaging one of said faces and thus having opposed portions, a plurality of fasteners spaced lengthwise of and extending through the tread-forming strip and securing the metal strip to the tread-forming strip, an elongated metallic hub disposed at the pedal axis, and members oppositely extending from the hub to the opposed portions of the metal strip and mounting to the tread-forming strip on the hub.

3. A pedal for a foot-propelled vehicle as set forth in claim 2, the tread forming strip being grooved from end to end thereof to accommodate the metal strip.

4. A pedal for a foot-propelled vehicle as set forth in claim 2, said members mounting the tread-forming strip on the hub being substantially coextensive in length with the hub.

5. A pedal for a foot-propelled vehicle as set forth in claim 2, said hub being materially spaced, in the direction of its axis from the assembly formed by said strips.

6. A pedal for a foot-propelled vehicle comprising an elongated tread-forming strip of resilient material bent at its mid portion to extend across the pedal axis and having similar elongated end portions spaced from and at opposite sides of said axis, said strip being thus substantially U-shaped and having an inner and an outer face, two substantially U-shaped metal strips respectively engaging and conforming to the respective inner and outer faces of the tread-forming strip, a plurality of fasteners spaced lengthwise of and extending through the tread-forming strip and each securing both metal strips to the tread-forming strip, an elongated metallic hub disposed at the pedal axis, and means rigidly attaching said hub to the inner metal strip.

7. A pedal for a foot-propelled vehicle as set forth in claim 6, the inner and outer faces of the tread-forming strip being grooved substantially from end to end thereof to accommodate said metal strips.

8. A pedal for a foot-propelled vehicle comprising an elongated resilient strip bent to a substantial U-shape and forming a tread member, a metal strip engaging and conforming to the inner face of said tread member and having opposed portions, a plurality of spaced fastenings interconnecting the metal strip and tread member, a sheet metal reenforcing plate rigidly interconnecting the ends of the metal strip, said plate being apertured to clear a pin mounting the pedal, a hub disposed within and substantially coaxial with the tread member, and means rigidly connecting the hub to the opposed portions of said metal strip.

THOMAS I. DUFFY.